(12) United States Patent
Kozawa et al.

(10) Patent No.: US 8,821,652 B2
(45) Date of Patent: Sep. 2, 2014

(54) STEEL FOR INDUCTION HARDENING AND INDUCTION HARDENED STEEL PART

(75) Inventors: Shuji Kozawa, Tokyo (JP); Manabu Kubota, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 54 days.

(21) Appl. No.: 13/499,968

(22) PCT Filed: Oct. 7, 2010

(86) PCT No.: PCT/JP2010/068102
§ 371 (c)(1),
(2), (4) Date: Apr. 3, 2012

(87) PCT Pub. No.: WO2011/049006
PCT Pub. Date: Apr. 28, 2011

(65) Prior Publication Data
US 2012/0193000 A1      Aug. 2, 2012

(30) Foreign Application Priority Data
Oct. 22, 2009   (JP) .................................. 2009-243524

(51) Int. Cl.
| | |
|---|---|
| *C22C 38/04* | (2006.01) |
| *C22C 38/12* | (2006.01) |
| *C22C 38/28* | (2006.01) |
| *C22C 38/50* | (2006.01) |
| *C21D 1/42* | (2006.01) |
| *C22C 38/14* | (2006.01) |
| *C21D 9/52* | (2006.01) |
| *C21D 8/02* | (2006.01) |
| *C22C 38/02* | (2006.01) |
| *C21D 8/06* | (2006.01) |
| *C21D 1/10* | (2006.01) |
| *C21D 9/28* | (2006.01) |
| *C22C 38/06* | (2006.01) |

(52) U.S. Cl.
CPC ........... *C22C 38/02* (2013.01); *C21D 2211/005* (2013.01); *C21D 1/42* (2013.01); *C22C 38/04* (2013.01); *C22C 38/14* (2013.01); *C21D 9/525* (2013.01); *C21D 8/0263* (2013.01); *C21D 2211/001* (2013.01); *C21D 8/0236* (2013.01); *C21D 8/065* (2013.01); *C21D 8/0226* (2013.01); *C21D 1/10* (2013.01); *C21D 8/0247* (2013.01); *C21D 9/28* (2013.01); *C22C 38/12* (2013.01); *C22C 38/06* (2013.01)
USPC ........... 148/320; 148/328; 148/333; 148/334; 148/335; 148/336; 420/126; 420/127; 420/109; 420/110; 420/111

(58) Field of Classification Search
USPC .......... 148/320, 330, 333–336, 652; 420/126, 420/127
See application file for complete search history.

(56) References Cited

FOREIGN PATENT DOCUMENTS
JP       08-283910       10/1996
(Continued)

OTHER PUBLICATIONS

Machine-English translation of Japanese patent No. 2004-183065, Ochi Tatsuro et al., Jul. 2, 2004.*

(Continued)

*Primary Examiner* — Deborah Yee
(74) *Attorney, Agent, or Firm* — Kenyon & Kenyon LLP

(57) ABSTRACT

Steel for induction hardening wherein coarsening of austenite crystal grains can be prevented even at a high temperature of over 1100° C. such as which occurs at projecting parts of steel parts at the time of induction hardening, the steel for induction hardening characterized by containing, by mass %, C: 0.35 to 0.6%, Si: 0.01 to 1%, Mn: 0.2 to 1.8%, S: 0.001 to 0.15%, Al: 0.001 to 1%, Ti: 0.05 to 0.2%, and Nb: 0.001 to 0.04%, restricting N: 0.0060% or less, P: 0.025% or less, and O: 0.0025% or less, satisfying Nb/Ti≥0.015, and having a balance of iron and unavoidable impurities.

3 Claims, 1 Drawing Sheet

(56) References Cited

FOREIGN PATENT DOCUMENTS

| JP | 11-071630 | 3/1999 |
| JP | 11-236644 | 8/1999 |
| JP | 2004-162146 | 6/2004 |
| JP | 2004-183065 | 7/2004 |
| JP | 2007-204796 | 8/2007 |

OTHER PUBLICATIONS

International Search Report dated Jan. 25, 2011 issued in corresponding PCT Application No. PCT/JP2010/068102.

* cited by examiner

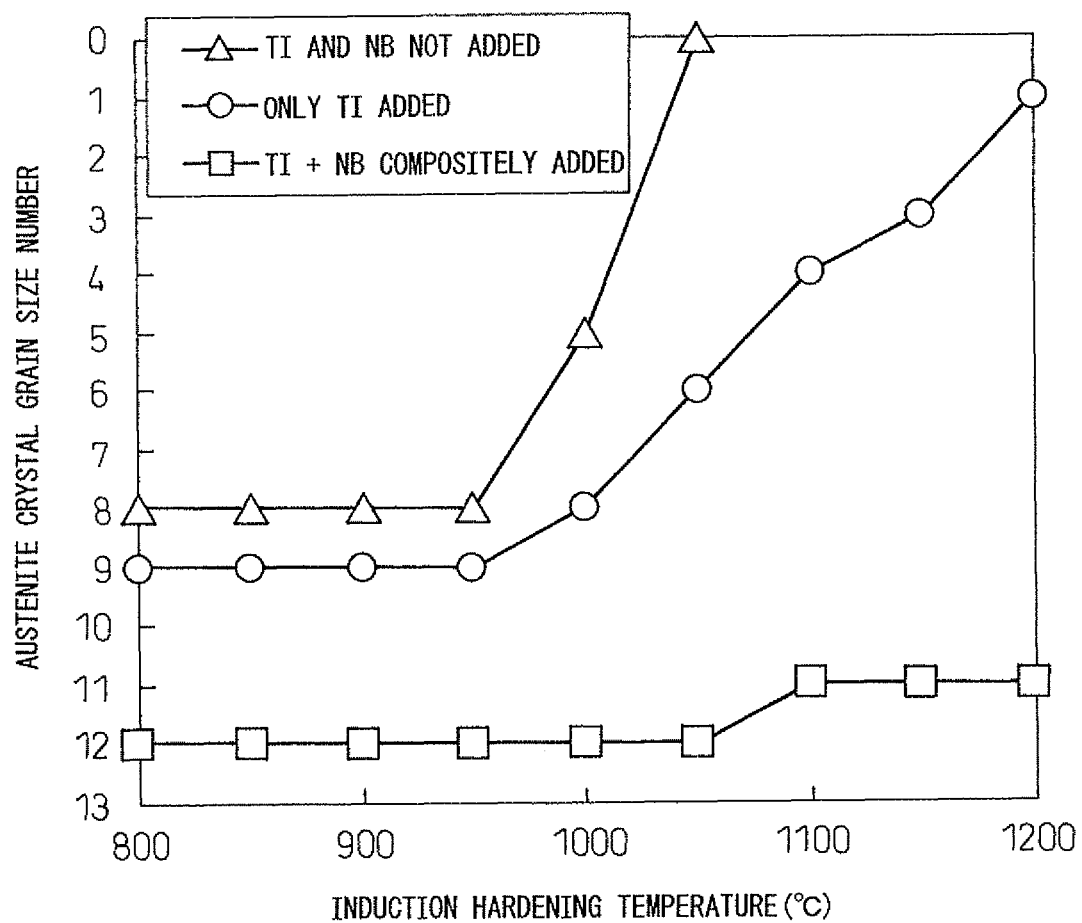

STEEL FOR INDUCTION HARDENING AND INDUCTION HARDENED STEEL PART

This application is a national stage application of International Application No. PCT/JP2010/068102, filed Oct. 7, 2010, which claims priority to Japanese Application No. 2009-243524, filed Oct. 22, 2009, the content of which is incorporated by reference in its entirety.

TECHNICAL FIELD

The present invention relates to steel for induction hardening and a steel part in which coarsening of austenite crystal grains is suppressed even in high temperature heating by high frequency waves and methods of production of the same.

BACKGROUND ART

A drive shaft, constant velocity joint outer race, constant velocity joint inner race, and other shaft parts forming the power transmission system of an automobile usually are produced by shaping medium carbon steel into predetermined part shapes by cutting, rolling, forging, etc. and then induction hardening and tempering them.

"Induction hardening" is the method of placing a part to be heated inside of a heating coil which is connected to a high frequency power supply, running high frequency current through the coil to generate an alternating magnetic flux, causing eddy current loss and hysteresis loss at the part to generate heat, and thereby hardening the part. Usually, it is performed for the purpose of hardening the surface.

In heating by a high frequency, in principle, step parts or groove parts of the parts are more easily insufficiently raised in temperature compared with other locations. Projecting parts are more easily overheated compared with other locations. Therefore, the temperature will not become uniform in the part as a whole.

For this reason, for induction hardening, heating is necessary so that the location as a whole treated by induction hardening is not insufficiently raised in temperature.

However, if heating so that the location as a whole treated by induction hardening is not insufficiently raised in temperature, a projecting part will become overheated in state by as much as 1100 to 1200° C. or so. For this reason, the austenite crystal grains will coarsen and accordingly the part will be distorted. Here, "coarsening" means specifically becoming a crystal grain size of less than no. 6.

As a measure against this, at the present, the practice is to use a special heating coil for each part and to strictly adjust the distance from the part or pretreat the part for reducing the temperature difference to keep the projecting part from becoming overheated in state as much as possible. However, these measures are not necessarily perfect.

PLT 1 discloses induction hardened steel, which prevents grain coarsening, which contains, in addition to predetermined amounts of C, Si, etc., by mass %, Ti: 0.05 to 0.20% and N: less than 0.01% and causes Ti carbides and Ti carbonitrides to finely disperse into the steel.

PLT 2 discloses a part for induction hardening use which contains, in addition to predetermined amounts of C, Si, etc., by mass %, Mo: 0.05 to 2.0% and which defines the working conditions of the material so as to cause Mo precipitates to become finer and make the crystal grains finer.

However, even if using the steel or working conditions which are disclose in PLT 1 and PLT 2, when locally becoming an over 1100° C. overheated state such as when induction hardening a part having a projecting part, coarsening of the austenite crystal grains at that location could not be prevented.

CITATION LIST

Patent Literature

PLT 1: Japanese Patent Publication (A) No. 11-71630
PLT 2: Japanese Patent Publication (A) No. 2007-204796

SUMMARY OF INVENTION

Technical Problem

The present invention solves the above problem by the provision of steel for induction hardening and a steel part for induction hardening which prevent coarsening of austenite crystal grains by induction hardening and can reduce distortion in the induction hardened steel part and methods of production of the same.

Solution to Problem

The inventors engaged in intensive investigations regarding the dominant causes of coarsening of austenite crystal grains at the time of induction hardening so as to achieve the above object and found the following points:

(1) To prevent coarsening of austenite crystal grains at the time of induction hardening, it is necessary to restrict the content of N in the steel to a low level so as to suppress the formation of TiN and, furthermore, to make Ti-based precipitates mainly comprised of TiC and TiCS finely precipitate at the time of induction hardening and to make Nb carbonitrides mainly comprised of NbC finely precipitate at the time of induction hardening. For this reason, it is necessary to add suitable amounts of both Ti and Nb as steel components.

(2) As the method for causing the above Ti-based precipitates and Nb carbonitrides to finely precipitate at the time of induction hardening, there is the method of utilizing the pinning effect of Ti-based precipitates and NbC precipitates. To stably obtain these effects, it is necessary to make the Ti-based precipitates and NbC precipitates finely precipitate in the matrix after hot rolling. For this reason, it is necessary to make the Ti-based precipitates and NbC precipitates precipitate at the phase interface at the time of diffusion and transformation from austenite in the cooling process at the time of hot rolling.

If bainite is formed in a structure as hot rolled, phase interface precipitation of the Ti-based precipitates and NbC precipitates will become difficult, so the structure has to be made one which does not contain much bainite at all.

(3) To make Ti-based precipitates and NbC precipitates finely precipitate in advance in steel rails or steel bars after hot rolling, it is sufficient to optimize the heating temperature at the time of hot rolling and the cooling conditions after hot rolling.

That is, by making the heating temperature at the time of hot rolling a high temperature, it is possible to make Ti-based precipitates and NbC precipitates form a solid solution once in the matrix. Further, by hot rolling, then slow cooling in the precipitation temperature region of Ti-based precipitates and NbC precipitates, it is possible to make these carbonitrides disperse finely in large amounts.

Ti-based precipitates are hard and have sharp edges, so coarse Ti-based precipitates form starting points of fatigue fracture. For this reason, in the past, the practice has been to greatly restrict the amount of Ti.

However, by making the Ti-based precipitates finer in the above way, it became possible to make effective use of Ti.

(4) If the ferrite grains of the steel material after hot rolling are excessively fine, at the time of induction hardening, grain coarsening will easily occur. For this reason, making the rolling finishing temperature a suitable one is also important.

(5) By cold working a hot rolled steel material, then induction hardening it in a short time without normalizing, it is possible to not only prevent coarsening of the austenite crystal grains, but also to promote grain fineness and improve the fatigue characteristics more than in the past.

The present invention was made based on the above new findings. The gist of the present invention is as follows:

(1) Steel for induction hardening comprising, by mass %,
C: 0.35 to 0.6%,
Si: 0.01 to 1%,
Mn: 0.2 to 1.8%,
S: 0.001 to 0.15%,
Al: 0.001 to 1%,
Ti: 0.05 to 0.2%, and
Nb: 0.001 to 0.04%,
restricting
N: 0.0060% or less,
P: 0.025% or less, and
O: 0.0025% or less,
satisfying
Nb/Ti≥0.015, and
having a balance of iron and unavoidable impurities.

(2) Steel for induction hardening as set forth in (1) characterized by further comprising, by mass %, one or more of
Cr: 0.05 to 0.2%,
Mo: 0.02 to 1.5%,
Ni: 0.1 to 3.5%,
V: 0.02 to 0.5%, and
B: 0.0002 to 0.005%.

(3) Steel for induction hardening characterized by being a wire rod or a steel bar, to which steel having component composition as set forth in (1) or (2) is hot rolled, having a bainite structure fraction of 30% or less (including 0%), and having a ferrite crystal grain size number defined by JIS G 0551 of no. 8 to 11.

(4) An induction hardened steel part produced from steel for induction hardening as set forth in (3), which is partially or completely cold worked, then induction hardened, characterized in that said steel part partially or completely has a ferrite crystal grain size number defined by JIS G 0551 of no. 11 or more.

(5) A method of production of steel for induction hardening comprising the steps of:
producing a wire rod or a steel bar from a steel comprising, by mass %,
C: 0.35 to 0.6%,
Si: 0.01 to 1%,
Mn: 0.2 to 1.8%,
S: 0.001 to 0.15%,
Al: 0.001 to 1%,
Ti: 0.05 to 0.2%, and
Nb: 0.001 to 0.04%,
restricting
N: 0.0060% or less,
P: 0.025% or less, and
O: 0.0025% or less,
satisfying
Nb/Ti≥0.015, and
having a balance of iron and unavoidable impurities, by hot rolling at a heating temperature of 1150 to 1300° C., a holding time of 10 to 180 minutes, and a finishing temperature of 840 to 1000° C.;
slow cooling the wire rod or the steel bar over a temperature range of 800 to 500° C. restricted to a cooling speed of 1° C./sec or less.

(6) A method of production of steel for induction hardening as set forth in (5) wherein said steel further comprises, by mass %,
Cr: 0.05 to 0.2%,
Mo: 0.02 to 1.5%,
Ni: 0.1 to 3.5%,
V: 0.02 to 0.5%, and
B: 0.0002 to 0.005%.

(7) A method of production of an induction hardened steel part comprising the steps of:
cold working part or all of steel which is produced by the method set forth in (5) or (6) by a reduction ratio of 50 to 90%;
induction hardening part or all of steel wherein the heating time of the induction hardening is 3 seconds or less.

Advantageous Effects of Invention

If using the steel for induction hardening of the present invention, it is possible to prevent the formation of coarse grains at projecting parts at the time of induction hardening in the production of a drive shaft, constant velocity joint outer race, constant velocity joint inner race, and other shaft parts having projecting parts forming the power transmission system of an automobile. As a result, it is possible to produce an induction hardened steel part which is reduced in distortion, so noise due to distortion can be reduced. Furthermore, it is possible to produce an induction hardened steel part which is improved in fatigue characteristics more than the past.

BRIEF DESCRIPTION OF DRAWINGS

FIG. 1 is a view showing the effect of improvement of the ability to prevent grain coarsening by the composite addition of Ti+Nb.

DESCRIPTION OF EMBODIMENTS

Below, as embodiments of the present invention, steel for induction hardening and induction hardened steel parts and methods for production of the same will be explained in detail.

First, the reasons for limitation of the component composition of steel of the present invention will be explained. Below, "%" means "mass %".

C: 0.35 to 0.6%

C is an element which is effective for imparting the required strength to steel. If the content of C is less than 0.35%, the strength required for the steel cannot be obtained, while if the content of C is over 0.6%, the steel will become hard, the cold workability will deteriorate, and, furthermore, the toughness after induction hardening will deteriorate. Therefore, the content of C has to be 0.35 to 0.6% in range. The more preferable content of C is 0.4 to 0.56%.

Si: 0.01 to 1%

Si is an element effective for deoxidation of steel. Furthermore, it is an element effective for imparting the necessary strength and hardenability to steel and for improving the temper softening resistance. If the content of Si is less than 0.01%, the effect cannot be sufficiently obtained. If the content of SI is over 1%, the hardness of the steel rises and the cold workability deteriorates. Therefore, the content of Si has to be made 0.01 to 1% in range. Si gives a high deformation resistance in the cold state, so in the case of a steel material for cold forged part applications, the more preferable Si content is 0.01 to 0.15%.

Mn: 0.2 to 1.8%

Mn is an element effective for deoxidation of steel and furthermore is an element effective for imparting strength and hardenability to steel. If the content of Mn is less than 0.2%, the effect is not sufficiently obtained. If the content of Mn is over 1.8%, the effect is saturated and, furthermore, the hardness of the steel rises and the cold workability deteriorates. Therefore, the content of Mn has to be 0.2 to 1.8% in range. The more preferable content of Mn is 0.5 to 1.2%. If stressing cold workability, the content of Mn is more preferably 0.5 to 0.75% in range.

S: 0.001 to 0.15%

S forms MnS in steel as a result of which the machineability is improved. If the content of S is less than 0.001%, the effect cannot be sufficiently obtained. If the content of S is over 0.15%, the effect becomes saturated and, furthermore, grain boundary segregation occurs and grain boundary embrittlement is invited. Therefore, the content of S has to be 0.001 to 0.15% in range. If stressing the machineability of steel, the content of S is preferably made 0.005 to 0.15% in range. If stressing the grain boundary strength, the content of S is preferably 0.001 to 0.030% in range. If stressing both the machineability and the grain boundary strength, the content of S is preferably 0.005 to 0.070% in range.

Al: 0.001 to 1%

Al is an element effective for deoxidation of steel and improvement of machineability. If the content of Al is less than 0.001%, the effect of deoxidation cannot be sufficiently obtained. The Al in steel partially bonds with N to precipitate as AlN. Further, it partially bonds with 0 to be present as alumina. The remainder is present as solid solution Al. The solid solution Al effectively acts to improve the machineability. Accordingly, when stressing the machineability, the content of Al has to be made more than 0.05%. If the content of Al is over 1%, it has a great effect on the transformation characteristics of the steel, so the upper limit is made 1%. When stressing the machineability of the steel, the content of Al is preferably 0.05 to 1% in range. If not stressing the machineability that much, the content of Al is preferably 0.02 to 0.05% in range.

Ti: 0.05 to 0.2%

Ti forms fine TiC and TICS in steel due to which, at the time of induction hardening, the austenite crystal grains become finer. If the content of Ti is less than 0.05%, the effect cannot be sufficiently obtained. If the content of Ti becomes more than 0.1%, the austenite crystal grains become remarkably finer. If the content of Ti is over 0.2%, due to the precipitation hardening by TiC, the cold workability remarkably deteriorates. Furthermore, due to the TiN-based precipitates, the rolling contact fatigue characteristics deteriorate. Therefore, the upper limit of the content of Ti is made 0.2%. The more preferable content of Ti is over 0.1 to 0.2%.

Nb: 0.001 to 0.04%, Nb/Ti≥0.015

Nb bonds with the C and N in the steel at the time of induction hardening so as to form Nb(CN) and thereby suppresses coarsening of the austenite crystal grains.

FIG. 1 shows the relationship between the induction hardening temperature and austenite crystal grain size number when changing the amounts of addition of Ti and Nb. The amounts of addition of Ti and Nb are, when adding Ti alone, Ti: 0.13% and, when compositely adding Ti and Nb, and Ti: 0.13% and Nb: 0.005%. The rest of the component composition is C: 0.53 to 0.54%, Si: 0.01 to 0.02%, Mn: 0.61 to 0.63%, S: 0.009 to 0.010%, Al: 0.025 to 0.026%, N: 0.0048 to 0.0050%, P: 0.013 to 0.014%, O: 0.0008 to 0.0009%, and a balance of iron and unavoidable impurities.

As will be understood from FIG. 1, by the composite addition of Ti and Nb, the effect of prevention of grain coarsening of the Ti-based precipitates becomes more effective. This is because Nb forms a solid solution in the Ti-based precipitates and suppresses coarsening of the Ti-based precipitates. To obtain this effect, it is necessary that Nb/Ti≥0.015 be satisfied.

The present invention is characterized by the addition of both Ti and Nb. The improvement of the effect of prevention of grain coarsening by the addition of both Ti and Nb is also seen at less than 1100° C. The important point in the present invention is that, at a higher temperature, specifically at the temperature of the projecting parts at the time of induction hardening of 1100 to 1200° C., the effect of prevention of grain coarsening is improved more.

However, if adding Nb, the machineability and the cold workability of the steel deteriorate. In particular, if the amount of addition of Nb becomes 0.04% or more, the steel becomes harder, the machineability and the cold workability deteriorate, and, furthermore, melting at the time of heating in hot rolling becomes difficult. Therefore, the content of Nb has to be made 0.04% or less. When stressing the machineability, cold workability, and other workability, the content of Nb is preferably less than 0.03%. If the content of Nb becomes less than 0.001%, it is not possible to stably satisfy Nb/Ti≥0.015, so the lower limit of the content of Nb is made 0.001%.

N: restricted to 0.0060% or less

N is unavoidably contained in steel. If bonding with the Ti in the steel, it forms coarse TiN which does not contribute much at all to control of the crystal grains. This forms precipitation sites for Ti-based precipitates of mainly TiC and TiCS and Nb(CN) of mainly NbC and NbC, obstructs fine precipitation of these Ti-based precipitates and Nb carbonitrides, and promotes the formation of coarse grains. If the content of N is over 0.0060%, this effect appears particularly remarkably. Therefore, the content of N is restricted to 0.0060% or less, more preferably less than 0.0050%.

P: restricted to 0.025% or less

P is unavoidably contained in steel. It is also an element which raises the deformation resistance at the time of cold working and degrades the toughness, so as a result degrades the cold workability of steel. Further, it makes the crystal grain boundaries of parts after hardening and tempering brittle, so degrades the fatigue strength. Therefore, the content of P is preferably reduced as much as possible. Therefore, the content of P is made 0.025% or less, more preferably 0.015% or less.

O: restricted to 0.0025% or less

O is unavoidably contained in steel. In high Ti steel like the present invention, 0 forms Ti-based oxide-based inclusions in the steel. If the oxide-based inclusions are present in large amounts in steel, they will form precipitation sites for TiC. TiC will precipitate coarsely at the time of hot rolling and, as a result, coarsening of austenite crystal grains at the time of induction hardening will no longer be able to be suppressed. Therefore, the content of 0 is preferably reduced as much as possible. Accordingly, the content of O is restricted to 0.0025% or less. The more preferable range is 0.0020% or less. In a bearing part or rolling contact part, since oxide-based inclusions form the starting point for rolling contact fatigue fracture, the lower the content of 0, the better the rolling contact life. For this reason, in bearing parts and rolling contact parts, the content of O is more preferably restricted to 0.0012% or less.

The steel of the present invention may also further include, for the purpose of improving the strength and hardenability, one or more of Cr, Mo, Ni, V, and B as optional components.

Cr: 0.05 to 0.2%

Cr is an element which, by addition, is effective for imparting strength and hardenability to steel. If the content of Cr is less than 0.05%, the effect cannot be sufficiently obtained. Cr forms a solid solution in cementite to stabilize the cementite, so at the time of the short heating in induction hardening, easily causes poor dissolution of cementite and becomes a cause of uneven hardness. Therefore, the upper limit of the content of Cr is made 0.2%. The more preferable content of Cr is 0.07 to 0.15%.

Mo: 0.02 to 1.5%

Mo is an element which, by addition, is effective for imparting strength and hardenability to steel. If the content of Mo is less than 0.02%, the effect cannot be sufficiently obtained. If the content of Mo is over 1.5%, the steel rises in hardness and deteriorates in machineability and cold workability. Therefore, the content of Mo is made 1.5% or less, more preferably 0.5% or less.

Ni: 0.1 to 3.5%

Ni is an element which, by addition, is effective for imparting strength and hardenability to steel. If the content of Ni is less than 0.1%, the effect cannot be sufficiently obtained. If the content of Ni is over 3.5%, the steel rises in hardness and deteriorates in machineability and cold workability. Therefore, the content of Ni is made 3.5% or less, more preferably 2.0% or less.

V: 0.02 to 0.5%

V is an element which, by addition, is effective for imparting strength and hardenability to steel. If the content of V is less than 0.02%, the effect cannot be sufficiently obtained. If the content of V is over 0.5%, the steel rises in hardness and deteriorates in machineability and cold workability. Therefore, the content of V is made 0.5% or less, more preferably 0.2% or less.

B: 0.0002 to 0.005%

B is an element which, by addition, is effective for imparting strength and hardenability to steel.

Furthermore, B has the following effects:

(1) The effect of, when hot rolling to obtain a steel rail or steel bar, forming boron iron carbides in the cooling process after the rolling to thereby increase the growth rate of ferrite and promote softening as rolled.
(2) The effect of improving the grain boundary strength of the induction hardened material to thereby improve the fatigue strength and impact strength of the induction hardened steel part.

If the content of B is less than 0.0002%, the above effects cannot be obtained. If the content of B exceeds 0.005%, the effects become saturated and, furthermore, the impact strength deteriorates and other detrimental effects become a concern. Therefore, the content of B is made 0.005% or less, more preferably 0.003% or less.

The steel of the present invention, to improve the machineability, may also contain, in addition to the above components, one or more of Ca, Zr, Mg, Sb, Sn, Zn, Te, Bi, and Pb in a range not detracting from the effects of the present invention.

Next, the microstructure of the steel of the present invention will be explained.

The steel for induction hardening of the present invention is restricted in the bainite structure fraction after hot rolling to 30% or less (including 0%). This is because if bainite structures are mixed into the steel material after hot rolling, they become a cause of formation of coarse grains at the time of induction hardening. Further, suppression of the intermixture of bainite is also preferable from the viewpoint of improvement of the cold workability.

These deleterious effects become particularly noticeable when the bainite structure fraction exceeds 30%. The smaller the better. For the above reasons, the bainite structure fraction after hot rolling has to be restricted to 30% or less (including 0%).

Further, in the steel for induction hardening of the present invention, the ferrite crystal grain size number after hot rolling is made no. 8 to 11 defined by JIS G 0551 (2005 edition).

If the ferrite grains after hot rolling becomes excessively fine, at the time of induction hardening, the austenite grains become excessively fine. If the austenite grains become excessively fine, coarse grains are easily formed. In particular, if the ferrite crystal grain size number exceeds no. 11 defined by JIS G 0551, this tendency becomes remarkable. Further, if the austenite grains become excessively fine, this results in insufficient strength due to deterioration of the hardenability and other problems.

On the other hand, if the ferrite crystal grain size number after hot rolling becomes a coarse grain of less than no. 8, the hot rolling material deteriorates in ductility and deteriorates in cold workability.

Therefore, the ferrite crystal grain size number after hot rolling has to be made within the range of no. 8 to 11 prescribed in JIS G 0551.

Furthermore, according the present invention, part or all of the steel for induction hardening is cold worked, then induction hardened to produce an induction hardened steel part in which part or all of the steel has an austenite crystal grain size number defined by JIS G 0551 of no. 11 or more.

Below, the methods of production of steel for induction hardening and the induction hardened steel part of the present invention will be explained.

Steel of the above component composition can be obtained by smelting using a converter, electric furnace, etc. while adjusting the components by the usual method. After this, it is run through a casting process and, if necessary, a slabbing process to obtain a material for hot rolling into a steel rail or steel bar.

Next, the rolled material is heated to 1150° C. to 1300° C. in temperature and held there for 10 minutes to 180 minutes. If the heating temperature is less than 1150° C. or the holding time is less than 10 minutes, the Ti-based precipitates and Nb precipitates cannot be made to form solid solutions in the matrix once, so the necessary amounts of Ti-based precipitates and Nb precipitates cannot be made to finely precipitate in advance in the hot rolled steel material. As a result, after hot rolling, coarse Ti-based precipitates and Nb precipitates form and formation of coarse grains at the time of induction hardening can no longer be suppressed.

Therefore, in the hot rolling, it is necessary to heat to a temperature of 1150° C. or more and hold it for 10 minutes or more. The more preferable conditions are a heating temperature of 1180° C. or more and a holding time of 10 minutes or more.

If the heating temperature is over 1300° C. or the holding time is over 180 minutes, the steel material is decarburized, scale forms, and the yield remarkably drops. Therefore, the heating temperature was made 1300° C. or less and the holding time was made 180 minutes or less.

The finishing temperature of the hot rolling is made 840° C. to 1000° C. If the finishing temperature is less than 840° C., the ferrite crystal grain size becomes excessively fine and, at the time of induction hardening, coarse grains easily form. If the finishing temperature exceeds 1000° C., the rolled material becomes hard and deteriorates in cold workability.

Next, the hot rolled steel rail or steel bar is slowly cooled over the 800 to 500° C. temperature range while restricted to a cooling speed of 1° C./sec or less. If the cooling speed exceeds 1° C./s, the time by which the precipitation temperature region of Ti-based precipitates is passed is short, so the amount of precipitation of fine TiC-based precipitates and NbC becomes insufficient and, furthermore, the bainite structure fraction becomes larger. As a result, at the time of induction hardening, coarsening of austenite crystal grains can no longer be suppressed.

Further, if the cooling speed is fast, the rolled material rises in hardness and deteriorates in cold workability, so the cooling speed is preferably made as small as possible. The more preferable cooling speed is 0.7° C./sec.

As the method for reducing the cooling speed, the method of installing a holding cover or a holding cover with a heat source after the rolling line and using this for slow cooling. The cooling speed should be restricted to 1° C./sec or less. The lower limit may be set considering the equipment conditions and operating conditions.

The size of the cast slab, the cooling speed at the time of solidification, and the slabbing conditions are not particularly limited. They may be any conditions so long as the requirements of the present invention are satisfied.

The induction hardened steel part of the present invention can be obtained by working the steel for induction hardening produced by the above method, in accordance with need, by cold working to give a reduction ratio of 50 to 90%, then hardening part or all by induction heating while restricting the heating time to 3 seconds or less.

The reduction ratio is made 50 to 90% because if performing induction hardening on a steel material worked by a reduction ratio of 50 to 90% cold at the recrystallization temperature (about 500° C.) or less, the dislocations which are introduced by the cold working form nuclei for formation of austenite grains, and austenite grains are formed all over the place.

If the reduction ratio is less than 50%, introduction of the dislocations forming the nuclei for formation of austenite grains becomes insufficient. If the reduction ratio is 90% or more, at the time of induction hardening, the austenite grains become excessively fine and, as a result, abnormal grain growth easily occurs.

Due to this, furthermore, by restricting the induction hardening time to 3 seconds or more, it is possible to stably obtain an induction hardened steel part with an austenite crystal grain size number of no. 11 or more even at locations which are overheated to a maximum of 1100 to 1200° C.

The induction hardening time is 3 seconds or less of time. The heating time by which the temperature required for hardening is obtained may be suitably set.

Due to the above method, it is possible to solve the problem where, in the past, in an induction hardened steel part, the austenite crystal grains coarsened at the projecting part and the crystal grain size became less than no. 6 and therefore distortion occurred and possible to obtain an induction hardened steel part with an austenite crystal grain size number, even at the projecting part, of no. 11 or more. Due to this, it is possible to obtain an induction hardened steel part in which occurrence of distortion can be prevented and which, furthermore, is superior in rolling contact fatigue, torsional fatigue strength, and other fatigue strength compared with a conventional induction hardened steel part.

The austenite crystal grain size number is not particularly limited, but to promote martensite transformation by hardening, is preferably made no. 14 or less.

Further, if cold working, then normalizing the part before induction hardening, the dislocations which are introduced by cold working are eliminated and a grain refining effect can no longer be obtained, so normalizing is not performed after cold working and before induction hardening.

EXAMPLES

Below, the advantageous effects of the present invention will be shown more specifically by working examples.

Converter steel having each of the component compositions shown in Tables 1 to 2 was continuously cast and, when necessary, run through a slabbing process to obtain a 162 mm square rolled material. Next, this was hot rolled to obtain a steel bar of a diameter of 24 to 30 mm.

Here, the "solid solution Al" in Tables 1 to 2 means the Al which has been measured excluding the insoluble residue on the filter paper occurring in the process of analysis of Al. The method of analysis of Al is the method of analysis according to JIS G 1258 when Al is less than 0.1% and the method of analysis according to JIS G 1224 when Al is 0.1% or more.

TABLE 1

| Test no. | Class | Componetn composition (mass %) | | | | | | | | | | | | | | | | |
|---|---|---|---|---|---|---|---|---|---|---|---|---|---|---|---|---|---|---|
| | | C | Si | Mn | S | Al | Solid sol. Al | Ti | Nb | Nb/Ti | N | P | O | Cr | Mo | Ni | V | B |
| 1 | Inv. ex. | 0.53 | 0.25 | 0.80 | 0.010 | 0.025 | 0.020 | 0.130 | 0.005 | 0.038 | 0.0042 | 0.015 | 0.0010 | — | — | — | — | — |
| 2 | Inv. ex. | 0.35 | 0.26 | 0.81 | 0.011 | 0.027 | 0.021 | 0.122 | 0.003 | 0.025 | 0.0041 | 0.014 | 0.0011 | — | — | — | — | — |
| 3 | Inv. ex. | 0.60 | 0.25 | 0.82 | 0.028 | 0.050 | 0.042 | 0.052 | 0.015 | 0.288 | 0.0035 | 0.015 | 0.0009 | — | — | — | — | — |
| 4 | Inv. ex. | 0.50 | 0.98 | 0.51 | 0.005 | 0.085 | 0.075 | 0.051 | 0.021 | 0.412 | 0.0060 | 0.015 | 0.0009 | — | — | — | — | — |
| 5 | Inv. ex. | 0.51 | 0.25 | 0.60 | 0.008 | 0.103 | 0.099 | 0.199 | 0.004 | 0.020 | 0.0039 | 0.014 | 0.0010 | — | — | — | — | — |
| 6 | Inv. ex. | 0.52 | 0.24 | 0.71 | 0.015 | 0.950 | 0.943 | 0.101 | 0.005 | 0.050 | 0.0045 | 0.014 | 0.0008 | 0.14 | — | — | — | — |
| 7 | Inv. ex. | 0.40 | 0.25 | 0.82 | 0.149 | 0.026 | 0.022 | 0.131 | 0.002 | 0.015 | 0.0044 | 0.016 | 0.0009 | — | 1.30 | — | — | — |
| 8 | Inv. ex. | 0.50 | 0.63 | 0.83 | 0.065 | 0.206 | 0.201 | 0.133 | 0.039 | 0.293 | 0.0051 | 0.014 | 0.0011 | — | 0.35 | 3.21 | — | — |
| 9 | Inv. ex. | 0.53 | 0.25 | 1.19 | 0.015 | 0.026 | 0.017 | 0.130 | 0.005 | 0.038 | 0.0049 | 0.015 | 0.0010 | — | 0.16 | — | 0.20 | — |
| 10 | Inv. ex. | 0.51 | 0.24 | 1.06 | 0.060 | 0.026 | 0.019 | 0.129 | 0.028 | 0.217 | 0.0045 | 0.013 | 0.0009 | — | — | — | — | 0.0049 |
| 11 | Inv. ex. | 0.45 | 0.26 | 0.80 | 0.030 | 0.028 | 0.023 | 0.180 | 0.007 | 0.039 | 0.0039 | 0.014 | 0.0009 | — | — | 1.80 | — | — |
| 12 | Inv. ex. | 0.53 | 0.25 | 0.81 | 0.006 | 0.502 | 0.495 | 0.131 | 0.009 | 0.069 | 0.0041 | 0.015 | 0.0010 | — | — | 0.58 | — | — |
| 13 | Inv. ex. | 0.53 | 0.01 | 0.61 | 0.009 | 0.025 | 0.021 | 0.130 | 0.005 | 0.038 | 0.0048 | 0.013 | 0.0008 | — | — | — | — | — |
| 14 | Inv. ex. | 0.52 | 0.03 | 0.50 | 0.062 | 0.026 | 0.019 | 0.130 | 0.003 | 0.023 | 0.0043 | 0.012 | 0.0007 | — | — | — | — | 0.0026 |

TABLE 1-continued

| Test no. | Class | C | Si | Mn | S | Al | Solid sol. Al | Ti | Nb | Nb/Ti | N | P | O | Cr | Mo | Ni | V | B |
|---|---|---|---|---|---|---|---|---|---|---|---|---|---|---|---|---|---|---|
| 15 | Inv. ex. | 0.56 | 0.06 | 0.75 | 0.026 | 0.026 | 0.023 | 0.161 | 0.003 | 0.019 | 0.0045 | 0.025 | 0.0006 | — | — | — | — | 0.0015 |
| 16 | Inv. ex. | 0.53 | 0.15 | 0.71 | 0.020 | 0.025 | 0.016 | 0.132 | 0.004 | 0.030 | 0.0046 | 0.015 | 0.0008 | — | — | — | — | — |
| 17 | Inv. ex. | 0.56 | 0.10 | 0.69 | 0.015 | 0.023 | 0.017 | 0.172 | 0.005 | 0.029 | 0.0041 | 0.015 | 0.0009 | — | — | — | — | — |
| 18 | Inv. ex. | 0.53 | 0.14 | 0.49 | 0.010 | 0.028 | 0.022 | 0.129 | 0.005 | 0.039 | 0.0040 | 0.015 | 0.0010 | — | — | — | — | — |
| 19 | Inv. ex. | 0.53 | 0.26 | 0.50 | 0.065 | 0.025 | 0.016 | 0.131 | 0.005 | 0.038 | 0.0049 | 0.015 | 0.0010 | — | — | — | — | — |
| 20 | Inv. ex. | 0.48 | 0.15 | 0.75 | 0.015 | 0.029 | 0.025 | 0.120 | 0.022 | 0.183 | 0.0040 | 0.010 | 0.0008 | 0.15 | — | — | — | — |

TABLE 2

| Test no. | Class | C | Si | Mn | S | Al | Solid sol. Al | Ti | Nb | Nb/Ti | N | P | O | Cr | Mo | Ni | V | B |
|---|---|---|---|---|---|---|---|---|---|---|---|---|---|---|---|---|---|---|
| 21 | Inv. ex. | 0.53 | 0.08 | 0.82 | 0.015 | 0.025 | 0.019 | 0.132 | 0.008 | 0.061 | 0.0046 | 0.014 | 0.0011 | — | 0.16 | — | — | — |
| 22 | Inv. ex. | 0.53 | 0.12 | 0.68 | 0.030 | 0.028 | 0.022 | 0.180 | 0.007 | 0.039 | 0.0039 | 0.014 | 0.0009 | — | — | 1.80 | — | — |
| 23 | Inv. ex. | 0.50 | 0.15 | 0.53 | 0.065 | 0.101 | 0.095 | 0.133 | 0.038 | 0.286 | 0.0041 | 0.014 | 0.0009 | — | 0.35 | 2.19 | — | — |
| 24 | Inv. ex. | 0.36 | 0.14 | 0.57 | 0.025 | 0.027 | 0.016 | 0.185 | 0.004 | 0.022 | 0.0060 | 0.013 | 0.0010 | — | — | — | — | — |
| 25 | Inv. ex. | 0.40 | 0.12 | 0.74 | 0.015 | 0.026 | 0.018 | 0.130 | 0.005 | 0.038 | 0.0049 | 0.015 | 0.0010 | — | — | — | 0.11 | — |
| 26 | Inv. ex. | 0.53 | 0.10 | 0.55 | 0.015 | 0.029 | 0.025 | 0.133 | 0.009 | 0.068 | 0.0041 | 0.012 | 0.0009 | 0.06 | — | — | — | — |
| 27 | Inv. ex. | 0.56 | 0.15 | 0.75 | 0.014 | 0.026 | 0.021 | 0.125 | 0.008 | 0.064 | 0.0035 | 0.012 | 0.0008 | — | — | — | — | 0.00 |
| 28 | Inv. ex. | 0.50 | 0.14 | 0.60 | 0.008 | 0.103 | 0.098 | 0.130 | 0.005 | 0.038 | 0.0042 | 0.014 | 0.0010 | — | — | — | — | — |
| 29 | Comp. ex. | 0.53 | 0.26 | 0.81 | 0.009 | 0.060 | 0.055 | — | 0.005 | — | 0.0045 | 0.012 | 0.0009 | — | — | — | — | — |
| 30 | Comp. ex. | 0.52 | 0.24 | 0.10 | 0.008 | 0.025 | 0.013 | 0.130 | 0.006 | 0.046 | 0.0065 | 0.011 | 0.0010 | — | — | — | — | — |
| 31 | Comp. ex. | 0.53 | 0.23 | 0.81 | 0.010 | 0.024 | 0.017 | 0.129 | 0.001 | 0.008 | 0.0039 | 0.015 | 0.0009 | — | — | — | — | — |
| 32 | Comp. ex. | 0.53 | 0.25 | 0.80 | 0.009 | 0.025 | 0.021 | 0.133 | 0.045 | 0.338 | 0.0041 | 0.011 | 0.0009 | — | — | — | — | — |
| 33 | Comp. ex. | 0.53 | 0.25 | 0.79 | 0.009 | 0.025 | 0.020 | 0.015 | 0.005 | 0.333 | 0.0040 | 0.016 | 0.0008 | — | — | — | — | — |
| 34 | Comp. ex. | 0.53 | 0.25 | 0.81 | 0.009 | 0.026 | 0.020 | 0.122 | 0.006 | 0.049 | 0.0045 | 0.009 | 0.0009 | — | — | — | — | — |
| 35 | Comp. ex. | 0.53 | 0.24 | 0.81 | 0.010 | 0.026 | 0.019 | 0.132 | 0.005 | 0.038 | 0.0042 | 0.015 | 0.0010 | — | — | — | — | — |
| 36 | Comp. ex. | 0.53 | 0.26 | 0.80 | 0.010 | 0.026 | 0.022 | 0.134 | 0.005 | 0.037 | 0.0046 | 0.014 | 0.0009 | — | — | — | — | — |
| 37 | Comp. ex. | 0.51 | 0.25 | 0.81 | 0.010 | 0.025 | 0.017 | 0.129 | 0.005 | 0.039 | 0.0048 | 0.013 | 0.0008 | — | — | — | — | — |
| 38 | Comp. ex. | 0.50 | 0.14 | 0.60 | 0.008 | 0.103 | 0.098 | 0.130 | 0.005 | 0.038 | 0.0042 | 0.014 | 0.0010 | — | — | — | — | — |
| 39 | Comp. ex. | 0.50 | 0.14 | 0.60 | 0.008 | 0.103 | 0.098 | 0.130 | 0.005 | 0.038 | 0.0042 | 0.014 | 0.0010 | — | — | — | — | — |

The hot rolled steel bars were examined under a microscope. The bainite fraction was measured. Furthermore, in accordance with the provisions of JIS G 0551 (2005), the ferrite crystal grain size was measured.

The bainite fraction was determined by preparing a sample, corroding the sample by Nital, observing the structure under an optical microscope, and finding the area percentage of the bainite structures in the observed surface as a whole at that time.

Next, from a steel bar produced by the above process, or a steel bar after being cold worked by a reduction ratio of 50 to 92%, a φ3 mm×10 mmL cylindrical test piece was prepared. Induction hardening was performed simulating a projecting part of an induction hardened steel part.

The induction hardening conditions were use of a Fuji Electronic Industrial Thermecmastor Z (frequency 400 kHz), elevation of temperature by 140° C./sec to 1150° C., and holding for 0.2 second. After this, the test piece was hardened in a helium gas atmosphere.

After this, the cross-sectional surface was polished, corroded, and examined for old austenite grain size so as to find the austenite grain size. The austenite grain size was measured in accordance with JIS G 0551 (2005). About 10 fields were observed at 400× and the average was found. Grains of an austenite grain size of less than no. 6 were judged as coarse grains.

These measurement results are shown in Tables 3 to 4.

TABLE 3

| Test no. | Class Defined in appln. | Hot rolling conditions | | | | Bainite structure fraction after hot rolling % ≤30 | Ferrite crystal grain size number after rolling 8 to 11 | Test piece material before machining | Working rate | Old austenite grain size number after induction hardening |
|---|---|---|---|---|---|---|---|---|---|---|
| | | Holding temp. ° C. ≥1150 | Holding time min. ≥10 | Finishing temp. ° C. 840 to 1000 | Cooling speed ° C./sec ≤1 | | | | | |
| 1 | Inv. ex. | 1200 | 10 | 950 | 0.63 | 0 | 10 | Steel bar as is | — | 7 |
| 2 | Inv. ex. | 1250 | 10 | 950 | 0.48 | 0 | 10 | Steel bar as is | — | 7 |
| 3 | Inv. ex. | 1200 | 10 | 950 | 0.65 | 28 | 10 | Steel bar as is | — | 6 |
| 4 | Inv. ex. | 1200 | 10 | 950 | 0.53 | 0 | 10 | Steel bar as is | — | 7 |

TABLE 3-continued

| Test no. | Class Defined in appln. | Hot rolling conditions Holding temp. °C. ≥1150 | Holding time min. ≥10 | Finishing temp. °C. 840 to 1000 | Cooling speed °C./sec ≤1 | Bainite structure fraction after hot rolling % ≤30 | Ferrite crystal grain size number after rolling 8 to 11 | Test piece material before machining | Working rate | Old austenite grain size number after induction hardening |
|---|---|---|---|---|---|---|---|---|---|---|
| 5 | Inv. ex. | 1200 | 10 | 960 | 0.05 | 0 | 11 | Steel bar as is | — | 7 |
| 6 | Inv. ex. | 1200 | 10 | 950 | 0.55 | 0 | 11 | Steel bar as is | — | 7 |
| 7 | Inv. ex. | 1200 | 12 | 940 | 0.42 | 26 | 9 | Steel bar as is | — | 8 |
| 8 | Inv. ex. | 1190 | 15 | 950 | 0.49 | 13 | 9 | Steel bar as is | — | 8 |
| 9 | Inv. ex. | 1180 | 20 | 930 | 0.51 | 6 | 8 | Steel bar as is | — | 8 |
| 10 | Inv. ex. | 1170 | 10 | 900 | 0.5 | 0 | 10 | Steel bar as is | — | 7 |
| 11 | Inv. ex. | 1150 | 10 | 840 | 0.55 | 0 | 11 | Steel bar as is | — | 7 |
| 12 | Inv. ex. | 1200 | 10 | 950 | 0.53 | 0 | 9 | Steel bar as is | — | 7 |
| 13 | Inv. ex. | 1200 | 10 | 950 | 0.49 | 5 | 9 | Cold worked | 50% | 11 |
| 14 | Inv. ex. | 1200 | 10 | 1000 | 0.51 | 0 | 10 | Cold worked | 70% | 12 |
| 15 | Inv. ex. | 1200 | 10 | 950 | 0.52 | 0 | 9 | Cold worked | 90% | 14 |
| 16 | Inv. ex. | 1200 | 15 | 950 | 0.52 | 0 | 10 | Cold worked | 90% | 12 |
| 17 | Inv. ex. | 1200 | 10 | 950 | 0.6 | 0 | 10 | Cold worked | 80% | 13 |
| 18 | Inv. ex. | 1200 | 10 | 950 | 0.53 | 0 | 9 | Cold worked | 80% | 13 |
| 19 | Inv. ex. | 1180 | 20 | 950 | 0.6 | 0 | 10 | Cold worked | 70% | 12 |
| 20 | Inv. ex. | 1250 | 10 | 900 | 0.6 | 0 | 10 | Cold worked | 70% | 12 |

TABLE 4

| Test no. | Class Defined in appln. | hot rolling conditions Holding temp. °C. ≥1150 | Holding time min. ≥10 | Finishing temp. °C. 840 to 1000 | Cooling speed °C./sec ≤1 | Bainite structure fraction after hot rolling % ≤30 | Ferrite crystal grain size number after rolling 8 to 11 | Test piece material before machining | Working rate | Old austenite grain size number after induction hardening |
|---|---|---|---|---|---|---|---|---|---|---|
| 21 | Inv. ex. | 1200 | 10 | 950 | 0.53 | 0 | 10 | Cold worked | 70% | 13 |
| 22 | Inv. ex. | 1200 | 10 | 950 | 0.55 | 0 | 10 | Cold worked | 70% | 12 |
| 23 | Inv. ex. | 1200 | 20 | 950 | 0.6 | 0 | 8 | Cold worked | 90% | 12 |
| 24 | Inv. ex. | 1200 | 10 | 950 | 0.68 | 0 | 10 | Cold worked | 70% | 12 |
| 25 | Inv. ex. | 1150 | 10 | 950 | 0.5 | 0 | 9 | Cold worked | 50% | 11 |
| 26 | Inv. ex. | 1190 | 10 | 840 | 0.51 | 0 | 11 | Cold worked | 70% | 12 |
| 27 | Inv. ex. | 1180 | 10 | 950 | 0.53 | 0 | 10 | Cold worked | 70% | 13 |
| 28 | Inv. ex. | 1200 | 10 | 950 | 0.55 | 0 | 11 | Cold worked | 80% | 12 |
| 29 | Comp. ex. | 1200 | 10 | 950 | 0.52 | 0 | 10 | Steel bar as is | | 5 |
| 30 | Comp. ex. | 1200 | 10 | 950 | 0.55 | 0 | 9 | Steel bar as is | | 4 |
| 31 | Comp. ex. | 1200 | 10 | 950 | 0.51 | 0 | 8 | Steel bar as is | | 5 |
| 32 | Comp. ex. | 1200 | 10 | 950 | 0.52 | 0 | 8 | Cold worked | 70% | 4 |
| 33 | Comp. ex. | 1200 | 10 | 950 | 0.53 | 5 | 10 | Cold worked | 92% | 3 |
| 34 | Comp. ex. | 1200 | 8 | 950 | 0.51 | 0 | 8 | Steel bar as is | | 4 |
| 35 | Comp. ex. | 1200 | 10 | 950 | 1.14 | 33 | 10 | Steel bar as is | | 4 |
| 36 | Comp. ex. | 1200 | 10 | 800 | 0.52 | 0 | 12 | Steel bar as is | | 4 |
| 37 | Comp. ex. | 1100 | 10 | 950 | 0.5 | 0 | 10 | Steel bar as is | | 5 |
| 38 | Comp. ex. | 1200 | 10 | 950 | 0.55 | 0 | 11 | Cold worked | 30% | 7 |
| 39 | Comp. ex. | 1200 | 10 | 950 | 0.55 | 0 | 11 | Cold worked | 47% | 9 |

The steel bars of the invention examples had old austenite grain size numbers after induction hardening of no. 6 or more—good results. The test pieces obtained by cold working the steel bars of the invention examples had old austenite grain size numbers after induction hardening of no. 11 or more—also good results.

From the results, it is learned that if using the induction hardened steel of the present invention, coarsening of austenite crystal grains can be suppressed even when applying induction hardening to steel bars as they are.

Furthermore, it is learned that, by cold working, it is possible to obtain an induction hardened steel part, including also projecting parts, with an austenite crystal grain size number of no. 11 or more and the effect of the present invention is obtained much more. Due to this, distortion of the induction hardened steel part can be prevented.

Comparative Example 29 had a content of Ti under the range prescribed by the present invention. Comparative Example 29 had an old austenite grain size number after induction hardening of no. 5, that is, coarse grains.

Comparative Example 30 had a content of N over the range prescribed by the present invention. Comparative Example 30 had an old austenite grain size number after induction hardening of no. 4, that is, coarse grains.

Comparative Example 31 did not satisfy Nb/Ti≥0.015. Comparative Example 31 had an old austenite grain size number after induction hardening of no. 5, that is, coarse grains.

Comparative Example 32 had a content of Nb over the range prescribed by the present invention. Comparative Example 32 had an old austenite grain size number after induction hardening of no. 4, that is, coarse grains.

Comparative Example 33 had a content of Ti under the range prescribed by the present invention and furthermore had a reduction ratio of cold working over the range prescribed by the present invention. Comparative Example 33 had an old austenite grain size number after induction hardening of no. 3, that is, coarse grains.

Comparative Example 34 had a holding time at the time of hot rolling under the range prescribed by the present invention. Comparative Example 34 had an old austenite grain size number after induction hardening of no. 4, that is, coarse grains.

Comparative Example 35 had a cooling speed after hot rolling over the range prescribed by the present invention. Comparative Example 35 also had a bainite structure fraction after hot rolling over the range prescribed by the present invention and, further, had an old austenite grain size number after induction hardening of no. 4, that is, coarse grains.

Comparative Example 36 had a finishing temperature after hot rolling under the range prescribed by the present invention. Comparative Example 36 also had a ferrite crystal grain size number after hot rolling over the range prescribed by the present invention and, further, had an old austenite grain size number after induction hardening of no. 4, that is, coarse grains.

Comparative Example 37 had a heating temperature at the time of hot rolling under the range prescribed by the present invention. Comparative Example 37 had an old austenite grain size number after induction hardening of no. 5, that is, coarse grains.

Comparative Examples 38 and 39 had reduction ratios under the range prescribed by the present invention. Comparative Examples 38 and 39 had old austenite grain size numbers after induction hardening of no. 7 and no. 9. The effect of refinement of the austenite grains by cold working was not sufficiently obtained.

Industrial Applicability

If using the steel for induction hardening of the present invention, it is possible to prevent the formation of coarse grains at projecting parts of a drive shaft, constant velocity joint outer race, constant velocity joint inner race, and other shaft parts having projecting parts forming the power transmission system of an automobile. Furthermore, it is possible to produce an induction hardened steel part which is reduced in distortion and which is improved in fatigue characteristics more than the past, so noise due to distortion can be reduced. Therefore, the effect of the present invention in industry is extremely remarkable.

The invention claimed is:

1. Steel for induction hardening consisting of, by mass %,
C: 0.35 to 0.6%,
Si: 0.01 to 1%,
Mn: 0.2 to 1.8%,
S: 0.001 to 0.15%,
Al: 0.001 to 1%,
Ti: over 0.1 to 0.2%, and
Nb: 0.001 to 0.04%,
restricting
N: 0.0060% or less,
P: 0.025% or less, and
O: 0.0025% or less,
satisfying
Nb/Ti≥0.015, and
having a balance of iron and unavoidable impurities, a bainite structure fraction of 30% or less (including 0%), and a ferrite crystal grain size number defined by JIS G 0551 of no. 8 to 11.

2. Steel for induction hardening consisting of, by mass %,
C: 0.35 to 0.6%,
Si: 0.01 to 1%,
Mn: 0.2 to 1.8%,
S: 0.001 to 0.15%,
Al: 0.001 to 1%,
Ti: over 0.1 to 0.2%, and
Nb: 0.001 to 0.04%,
one or more of
Cr: 0.05 to 0.2%,
Mo: 0.02 to 1.5%,
Ni: 0.1 to 3.5%, and
V: 0.02 to 0.5%,
restricting
N: 0.0060% or less,
P: 0.025% or less, and
O: 0.0025% or less,
satisfying
Nb/Ti≥0.015, and
having a balance of iron and unavoidable impurities, a bainite structure fraction of 30% or less (including 0%), and a ferrite crystal grain size number defined by JIS G 0551 of no. 8 to 11.

3. An induction hardened steel part produced from steel for induction hardening as set forth in claim 1 or 2 which is cold worked, then induction hardened, wherein said steel part is cold worked to give a reduction ratio of 50 to 90% and then part or all of said steel part is induction hardened, wherein the part or all of said steel part has an austenite crystal grain size number defined by JIS G 0551 of no. 11 or more.

* * * * *

UNITED STATES PATENT AND TRADEMARK OFFICE
CERTIFICATE OF CORRECTION

PATENT NO. : 8,821,652 B2
APPLICATION NO. : 13/499968
DATED : September 2, 2014
INVENTOR(S) : Shuji Kozawa et al.

Page 1 of 1

It is certified that error appears in the above-identified patent and that said Letters Patent is hereby corrected as shown below:

In the Specification

Column 5, line 2, change "SI is over 1%," to -- Si is over 1%, --;

Column 5, line 49, change "fine TiC and TICS" to -- fine TiC and TiCS --.

Signed and Sealed this
Fourteenth Day of April, 2015

Michelle K. Lee
*Director of the United States Patent and Trademark Office*